Fig. 5.

Feb. 4, 1941.                J. R. MORRIS                2,230,694
                            CUTTING MACHINE
                        Filed May 20, 1938            6 Sheets-Sheet 6

Inventor
JOSEPH R. MORRIS.
By Frank Fraser
Attorney

Patented Feb. 4, 1941

2,230,694

UNITED STATES PATENT OFFICE 2,230,694

CUTTING MACHINE

Joseph R. Morris, Toledo, Ohio, assignor to Libbey-Owens-Ford Glass Company, Toledo, Ohio, a corporation of Ohio Application May 20, 1938, Serial No. 209,014

20 Claims. (Cl. 33—27)

The present invention relates to improvements in cutting machines generally and more particularly to a machine designed primarily for the cutting of glass sheets or plates, although it is of course not restricted to such use.

It is the aim of this invention to provide an improved cutting machine of novel construction and arrangement for cutting out from sheets or plates of glass or the like forms or lights of circular, elliptical, or irregular outline rapidly, accurately, and economically.

The cutting machine herein provided is of especial utility in those cases where it is desired to effect the cutting out of a relatively large number of sheets or plates of the same shape and size such as, for example, the door and window lights of automotive vehicles. To this end, the machine embodies a table for supporting the sheets to be cut, a template or pattern member of a predetermined shape and size mounted above said table, and a cutting unit mounted upon and movable along said template and having a cutting tool for effecting the cutting of the sheet along the desired line corresponding to the shape of the template.

Among the objects of the invention are the provision of a cutting machine of the above character having novel means for feeding the sheets into cutting position upon the table and for delivering them therefrom subsequent to cutting; means for automatically bringing the sheet to a stop when it reaches a predetermined position on said table; means for accurately positioning the sheet upon the table and for preventing accidental displacement thereof during cutting, and means for rendering said stop means ineffective to permit the discharge of the sheet from the table after it has been cut.

Other objects and advantages of the invention will become more apparent during the course of the following description, when taken in connection with the accompanying drawings.

In the drawings, wherein like numerals are employed to designate like parts throughout the same:

Fig. 2 is a front view thereof;

Fig. 3 is a vertical longitudinal section through the machine taken substantially on line 3—3 of Fig. 1;

Briefly, the cutting machine of this invention comprises a table supporting structure 10 having associated therewith a flat horizontal table top 11 for supporting the sheet of glass or the like 12 during the cutting thereof. Arranged above the table top 11 in vertically spaced relation thereto is a horizontal track template 13 having the same configuration as the form or light to be cut from the glass sheet 12. Mounted upon the track template 13 and guided thereby is the cutting mechanism including a cutting unit 14 provided with a rotatable steel cutting wheel 15 (Fig. 6), said unit being adapted to travel around the template 13 to score the glass sheet 12 along the line indicated at 16 in Fig. 1.

In accordance with the invention, means is provided for raising the table top 11 and glass sheet 12 supported thereon prior to the cutting operation and for maintaining them in elevated position during the said cutting operation, upon the completion of which the said table and sheet are adapted to be lowered. The machine further embodies means for feeding the glass sheet forwardly upon the table into proper position beneath the cutting mechanism and for also discharging the sheet from the table after it has been cut. Upon leaving the cutting table, the sheet is adapted to be received upon a take-off conveyor 17 provided with a traveling surface 18 for receiving the said sheet and carrying it away preferably at substantially right angles relative to said table. Means is also provided for automatically bringing the sheet to a stop when it reaches a predetermined position upon the cutting table, and for accurately positioning the said sheet upon the table and for preventing accidental displacement thereof during cutting. The machine further embodies various other novel feautres of construction, arrangement, and operation, which will be more fully hereinafter apparent.

Cutting table construction

Figure 4:
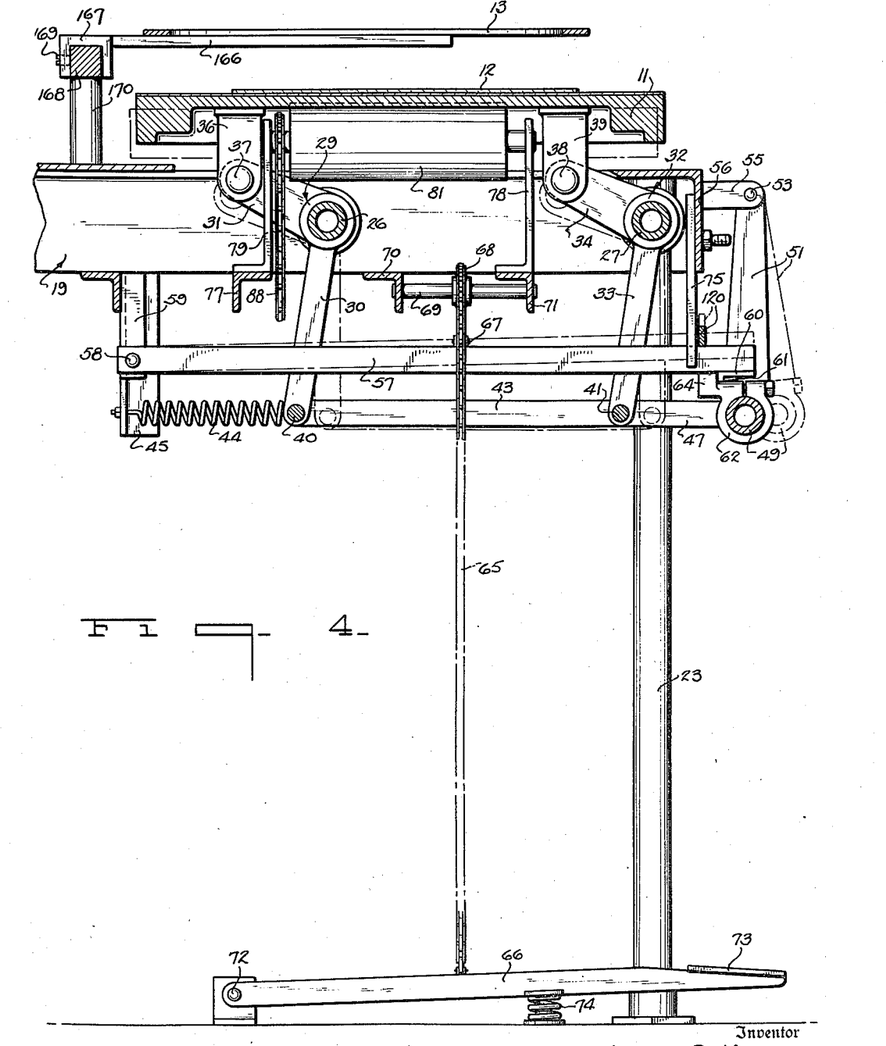
Fig. 4 is a vertical transverse section taken substantially on line 4—4 of Fig. 1.

As stated above, the cutting table comprises a supporting structure 10 and a vertically movable top 11 carried thereby. The supporting structure 10 includes a substantially rectangular horizontal frame 19 formed preferably of angle irons and supported adjacent its front end by the spaced vertical posts 20 and 21 and adjacent its rear end by similar posts 22 and 23. Extending longitudinally of the table and rotatably carried by the side members 24 and 25 of the supporting frame 19 are the spaced parallel shafts 26 and 27 (Fig. 4). Fixed to the shaft 26 adjacent its opposite ends are the two bell-crank levers 28 and 29, each comprising a substantially vertical depending leg 30 and a substantially horizontal relatively shorter leg 31. Keyed to the shaft 27 opposite bell-crank levers 28 and 29 on shaft 26 are similar bell-crank levers 32 each comprising a substantially vertical depending leg 33 and a substantially horizontal relatively shorter leg 34.

The table top 11 is substantially rectangular in plan and has secured to the underside thereof, spaced brackets 35 and 36 to which the substantially horizontal legs 31 of bell-crank levers 28 and 29 are pivoted as at 37 while the substantially horizontal legs 34 of bell-crank levers 32 are pivoted as at 38 to similar brackets 39 also carried upon the underside of the table top.

The depending legs 30 of bell-crank levers 28 and 29 are connected together at their lower ends by a horizontal rod 40 and a similar rod 41 connects the lower ends of the depending legs 33 of bell-crank levers 32. The parallel rods 40 and 41 are in turn connected together adjacent their opposite ends by horizontal links 42 and 43 so that all of the bell-crank levers will be caused to operate in unison. Fastened to the rod 40 adjacent each end thereof is one end of a tension spring 44 having its opposite end attached to a bracket 45 secured to the supporting framework 19. The springs 44 tend to normally urge the bell-crank levers in a clockwise direction to raise the table top 11, but they are not of sufficient strength to alone effect such raising.

The means for raising the table top 11 includes a pair of links 46 and 47 carried at the opposite ends of rod 41 and connected together at their outer ends by a horizontal shaft 48 which passes through and is rotatably supported in a tubular member 49 pivotally carried at its opposite ends by the vertical hangers 50 and 51 pivoted at their upper ends as at 52 and 53 to bracket plates 54 and 55 respectively secured to the front member 46 of the supporting frame 19. From the above it will be readily seen that when the tubular member 49 is forced inwardly, all of the bell-crank levers will be simultaneously rocked in a clockwise direction upon shafts 26 and 27 to effect the desired raising of the table. This raising of the table will be assisted by the action of the springs 44 which, as previously pointed out, always tend to raise the table but are not of sufficient strength to alone effect such raising. However, they do materially assist in the table raising by lessening the pressure required to be exerted by the operator upon tubular member 49.

Since the table top 11 is adapted to be maintained in raised position during the cutting of the glass sheet, means is provided for locking the said table top in its raised position, and for this purpose there is provided a horizontal locking bar 57, said bar being pivoted at its rear end as at 58 to a bracket 59 carried by supporting frame 19 and provided at its forward end with a latch plate 60, the undersurface 61 of which inclines rearwardly and downwardly. Associated with the locking bar 57 is a split collar 62 fitting around the tubular member 49 intermediate the ends thereof and secured in place by a screw or the like 63. The collar 62 is provided with a vertically projecting lug 64 which is adapted to cooperate with the latch plate 60 on the locking bar 57 to lock the table top in raised position.

In operation, when the tubular member 49 is moved inwardly to effect the raising of the table 11, the lug 64 engaging the inclined bottom surface 61 of latch plate 60 will act to raise the locking bar 57, but just as soon as the lug 64 passes inwardly beyond latch plate 60, the bar 57 will fall downwardly so that the latch plate 60 will be disposed in front of lug 64 as shown in Fig. 4, whereby to prevent lowering of the table until the locking bar 57 is again raised to release the lug 64. The release of the locking means is adapted to be effected by the operator after the cutting operation has been completed, whereupon the table will be caused to move downwardly by its own weight. To this end, there is provided a chain 65 fastened at one end to a foot pedal 66 and at its opposite end to the locking bar 57 as at 67, said chain 65 passing upwardly and over a sprocket 68 keyed to a horizontal shaft 69 journaled in the angle members 70 and 71 carried by supporting frame 19. The foot pedal 66 has a pivotal mounting 72 at its inner end and a foot engaging portion 73 at its outer end, said foot pedal being normally urged upwardly by a compression spring 74 positioned intermediate the ends thereof. Upon downward pressure upon the outer end 73 of the foot pedal, the forward end of the locking bar 57 will be lifted upwardly to release the lug 64 so that the table will be permitted to fall downwardly into lowered noncutting position. The downward movement of the table will be cushioned by the springs 44. The locking bar 57 may be guided in its vertical movement by a vertical strap 75 carried by supporting frame 19 and having its lower end slotted as at 76 to receive the said bar therein.

Extending parallel with the angle member 71 and also carried by the supporting frame 19 is a similar angle member 77 and carried by said members 71 and 77 are a plurality of spaced pairs of vertical bearing straps 78 and 79 respectively which rotatably carry at their upper ends conveyor rolls 80, 81, 82 and 83 which operate within transverse openings 84, 85, 86 and 87 respectively formed in the top of the table. All of the conveyor rolls 80 to 83 are preferably positively driven at all times at a constant uniform speed and by any suitable type of drive mechanism such as the well known type of chain and sprocket drive 88. During the feeding of the glass sheets 12 to be cut into desired cutting position upon the table, the table top 11 is in lowered position at which time the rolls 80 to 83 project upwardly slightly beyond the upper surface of the said table top, as shown in Fig. 3, to receive the glass sheet thereon. The sheet is carried forwardly by the rolls to the desired position on the table where it is automatically brought to a stop as will be later explained. The table top is then raised into cutting position whereupon the glass sheet will be transferred from the rolls to the stationary top of the table. The cutting of the sheet is then effected, after which the table top is lowered to again bring the sheet to rest upon the rolls whereupon the said rolls will discharge the sheet from the table onto the take-off conveyor 18, during which time another sheet is adapted to be delivered into cutting position upon the table.

*Sheet guiding and positioning means*

Figure 1:
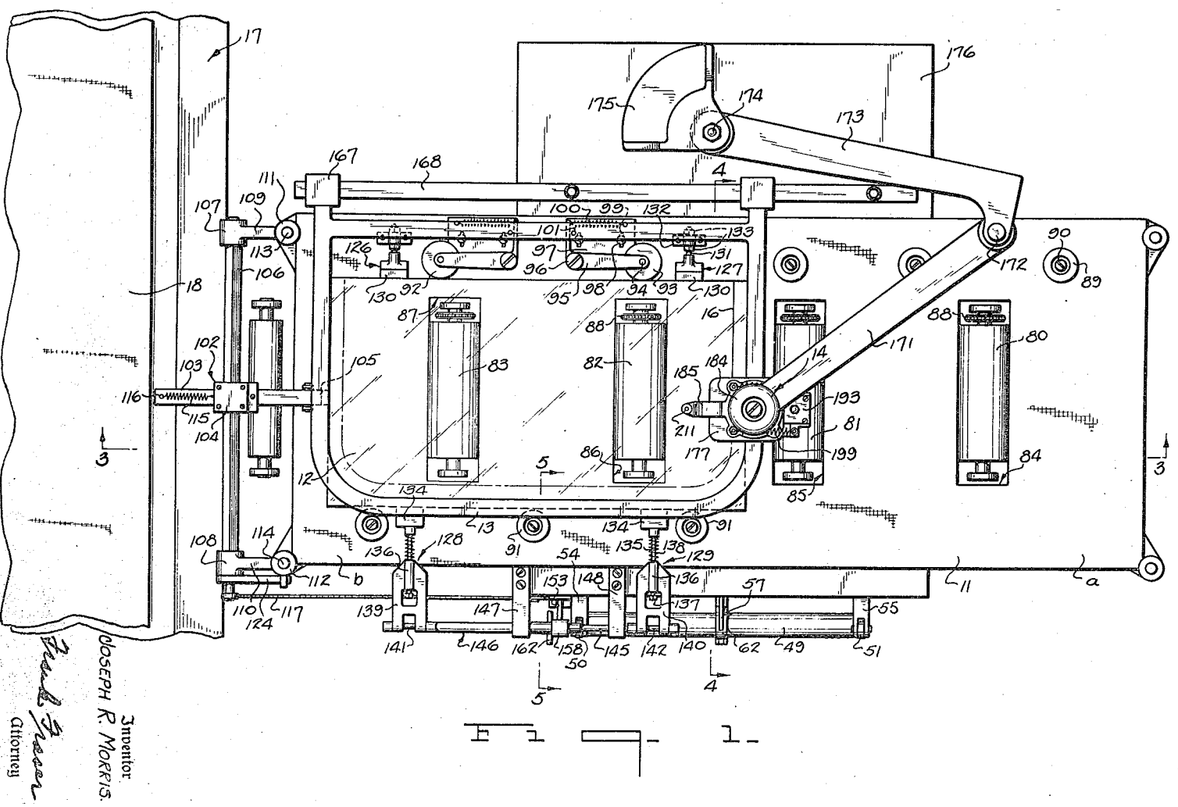
Fig. 1 is a plan view of a cutting machine constructed in accordance with the present invention.

The means for effecting the accurate positioning of the glass sheet upon the table and for maintaining the said sheet against accidental displacement during cutting will not be described in detail. With reference to Fig. 1, it will be seen that the table top 11 is relatively long and the right hand end portion designated a might be termed the receiving section while the left hand end portion indicated b can be called the cutting section. Thus, the conveyor rolls 80 and 81 are at the receiving end of the table and the conveyor rolls 82 and 83 at the cutting end thereof. The receiving section a of the table top 11 is provided along the rear edge thereof with a plurality of sheet edge engaging guide rollers 89 mounted in fixed horizontal alignment with one another and freely rotatable upon pins 90, while arranged along the forward edge of the cutting section b of the table are a plurality of aligned guide rollers 91 similar to rollers 89.

Arranged adjacent the rear edge of the cutting section b of the table is a pair of guide rollers 92 and 93 which engage the rear edge of the sheet and are spring pressed into engagement therewith. Each roller 92 and 93 is mounted to freely rotate upon a pin 94 carried at one end of a horizontal bell-crank lever 95, said lever being pivoted intermediate its ends as at 96 to a plate 97 secured to the table by screws 98 passing through slots 99 so that the guide roller can be adjusted inwardly or outwardly. Fastened to the opposite end of the bell-crank lever 95 is a tension spring 100 which serves to normally urge the guide roller inwardly into engagement with the rear edge of the sheet, the inward movement of said roller being limited by a stop pin 101 carried by plate 97. With this arrangement, when the glass sheet 12 is initially placed upon the cutting table, the rear edge thereof is moved into engagement with guide rollers 89 and as the sheet is carried forwardly upon the supporting rolls 80 to 83, it will be received between the guide rollers 91 which engage the forward edge of the sheet and guide rollers 92 and 93 which engage the rear edge thereof.

There is also provided at the discharge end of the cutting table means designated generally by the numeral 102 for limiting the forward movement of the glass sheet upon said table and for bringing the said sheet to a stop when it reaches a predetermined position thereon. The stop means 102 comprises a horizontal strip 103 slidable through a block 104 and provided at its inner end with a stop plate 105 engageable by the forward edge of the glass sheet. The block 104 is mounted upon a transverse bar 106 having cylindrical end portions passing through horizontal bearings 107 and 108 carried by arms 109 and 110 provided at their inner ends with vertical bearings 111 and 112 mounted upon vertical pins 113 and 114 respectively carried by the table top. The bar 106 is mounted for rocking movement and upon turning of the bar in a counter-clockwise direction (Fig. 2), the inner end of the strip 103 and stop plate 105 will be lifted upwardly out of the path of travel of the glass sheet as shown in broken lines thereby permitting the sheet to pass off of the table. However, when the stop plate 105 is in its lowered full line position, it is disposed in the path of travel of the glass sheet and upon engagement of the forward edge of the sheet with the said stop plate 105, the said sheet will be brought to a stop. The stop plate 105 is normally urged inwardly by a spring 115 fastened at one end to the block 104 and at its opposite end to a pin 116 on strip 103.

The means for lifting the stop plate 105 out of the path of travel of the glass sheet subsequent to the cutting operation to permit the removal of said sheet from the cutting table includes an operating chain 117 which passes over a sprocket 118 carried by the supporting frame 19. This chain is fastened at one end to a depending link 119 secured to one end of the bar 106 and at its opposite end to the outer end of a horizontal rocker arm 120 pivoted intermediate its ends as at 121 to a bracket 122 fixed to the supporting frame. The inner end of rocker arm 120 is disposed above the forward end of locking plate 57 so that when the locking plate is lifted upwardly by the operator to effect the lowering of the table top subsequent to cutting the rocker arm 120 will be rocked about its pivot 121 to cause the raising of the stop plate 105 to permit the glass sheet to pass from the table. The stop plate is normally urged downwardly by springs 123 engaging ears 124 fixed to the rod 106. It is preferred, in the operation of the machine, that the stop plate 105 be only momentarily raised at the completion of the cutting operation to permit the forward edge of the sheet to pass therebeneath, after which the said plate is lowered to rest upon the glass. In order to facilitate the passage of the sheet from the cutting table, relatively small rollers 125 can be carried by the strip 103 to ride along upon the upper surface of the glass sheet as the said sheet is delivered from the table. When the forward edge of the glass sheet engages the stop plate 105, the sheet will move the strip 103 slightly outwardly against the action of spring 115, but the sheet will be brought to a stop when the compression of the spring overcomes the force of said sheet. The stop means 102 thereby serves to bring the sheet automatically to a stop and without any assistance from the operator when the sheet reaches the desired position upon the table.

In order to clamp the glass sheet 12 firmly upon the table to prevent accidental displacement thereof during cutting, novel clamping members are provided to engage the front and rear edges of the sheet just prior to or simultaneous with the raising of the table to cutting position. The clamping members positioned to engage the rear edge of the sheet are designated 126 and 127, while the clamping members engaging the forward edge of the sheet are designated 128 and 129. The clamping members 126 and 127 are mounted in fixed position and each comprises a block 130 engaging the rear edge of the sheet and carried by a bolt 131 which passes through a bracket 132 carried by the table and is secured in adjusted position by nuts 133. By proper adjustment of the nuts 133, the clamping block 130 can be moved forwardly or rearwardly to the desired extent.

The clamping members 128 and 129 are mounted for horizontal movement toward and away from the glass sheet and upon engagement with the forward edge of the sheet are adapted to urge the rear edge thereof firmly against the clamping members 126 and 127. Each of the movable clamping members 128 and 129 comprises a clamping block 134 carried at the forward end of a bolt 135 which passes rearwardly through a sleeve 136 and has threaded upon its outer end a nut 137. Encircling the bolt 135 is a compression spring 138 bearing at its forward end against the clamping block 134 and at its opposite end against sleeve 136. The spring 138 serves to yieldably urge the clamping block forwardly and this forward movement is limited by the nut 137.

The sleeves 136 of clamping members 128 and 129 are formed integral with brackets 139 and 140 respectively, and these brackets are pivotally mounted at their outer ends upon horizontally aligned stub shafts 141 and 142 carried at the upper ends of vertical arms 143 and 144, said arms being connected together by a horizontal shaft 145 to form a substantially U-shaped yoke 146. The shaft 145 is journaled for rocking movement in bearing blocks 147 and 148 mounted upon the supporting frame 19. Carried by the front member 56 of supporting frame 19 is a vertical plate 149 formed at its lower end with horizontally spaced ears 150 carrying a horizontal pin 151 upon which is mounted a vertically disposed rocker lever 152, said rocker lever being mounted intermediate its end upon the pin 151 and provided with the upwardly and downwardly extending end portions 153 and 154 arranged at an obtuse angle relative to one another. The lower end 154 of rocker lever 152 is formed with a slot 155 through which passes the adjacent end of shaft 48, being held thereon by a nut 156. The upper end 153 of the rocker lever is received between the bifurcated lower end 157 of a block 158 loosely mounted at its upper end upon the shaft 145. The rocker lever is secured to the block 158 by a bolt 159 passing through a vertical slot 160 in the lower end 157 of said block and having threaded thereupon a nut 161.

Fixed to the shaft 145, by welding or the like, is a vertical plate 162 provided with an arcuate slot 163 through which passes a bolt 164 carrying nut 165 and by means of which the said plate 162 is secured to the block 158. By loosening the nut 165 on bolt 164, the yoke 146 can be rocked in bearings 147 and 148 to move the arms 143 and 144 and clamping members 128 and 129 carried thereby either inwardly or outwardly, and this adjustment is provided to take care of different sized sheets of glass which may be cut. Upon inward movement of the tubular member 49 to effect the raising of the table top, the rocker lever 152 will be rocked in a clockwise direction upon its pivot 151 (Fig. 5), whereupon the upper end thereof will be moved outwardly to effect turning of the shaft 145 in a counter-clockwise direction to move the clamping members 128 and 129 inwardly into engagement with the forward edge of the glass sheet, and these members will of course serve to urge the sheet into contact with clamping members 126 and 127. Thus, during the raising of the table and also during the time the table is in elevated position, the glass sheet will be firmly clamped in place between the fixed and movable clamping members.

Cutting mechanism

The template 13 for supporting and guiding the cutting unit 14 preferably consists of a relatively narrow track of the desired shape and size supported horizontally above the cutting table by horizontal supporting arms 166 having inverted U-shaped ends 167 which fit over a horizontal supporting bar 168 and are secured thereto by set screws 169. The bar 168 is mounted in spaced relation above the supporting table upon posts 170.

As shown in Fig. 1, the cutting unit 14 is carried at the outer end of a horizontal supporting arm 171 hinged at its inner end as at 172 to a second horizontal arm 173 which is pivoted as at 174 to a bracket 175 mounted upon a platform 176 carried by the supporting frame 19.

Figure 6:
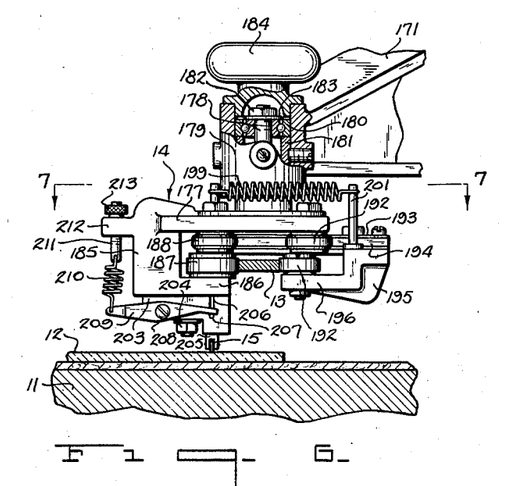
Fig. 6 is a side view of the cutting unit, partially in section.
Figure 7:
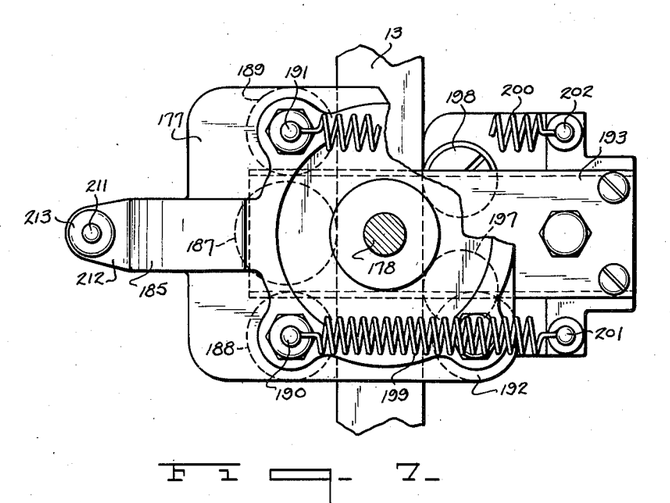
Fig. 7 is a horizontal section through the cutting unit taken substantially on line 7—7 of Fig. 6.

With reference particularly to Figs. 1, 6 and 7, the cutting unit 14 comprises a substantially rectangular horizontal top plate 177 carrying substantially centrally thereof a vertical stem or bolt 178 which passes upwardly through the bearing 179 formed at the outer end of supporting arm 171. Encircling the bolt 178 within bearing 179 adjacent the upper and lower ends thereof are ball bearing assemblies 180 which facilitate the turning of the cutting unit as it travels along the track template. The upper end of bolt 178 terminates within the bearing 177 and has threaded thereupon a nut 182 while interposed between the nut and the ball bearing assembly 178 is a washer 183. The nut and washer prevent the bolt 178 from slipping downwardly through the ball bearing assembly which is held in place by a bushing 181. Fitted in the upper end of the bearing 177 is a hand grip 184 which is adapted to be grasped by the operator in moving the cutting unit along the template.

The horizontal top plate 177 of the cutting unit is formed at one end thereof with a downwardly extending roller support 185 which lies adjacent one side of the template 13, said roller support including a substantially horizontal portion 186 carrying a freely rotatable roller 187 adapted to engage the adjacent side edge of the template.

Carried upon the underside of the top plate 177, adjacent one end thereof, are the opposed rollers 188 and 189 mounted upon vertical spindles 190 and 191 respectively, while carried upon the underside of said top plate adjacent the opposite end thereof are similar rollers 192 positioned in line with rollers 188 and 189 respectively. Slidably received between the rollers is a horizontal slide bar 193 positioned above the track template and extending at right angles thereto, said slide bar being provided with grooves 194 in its opposite side faces to receive the rollers 188, 189 and 192 therein, as best illustrated in Fig. 7.

Secured upon the underside of the slide bar 193 at the outer end thereof is a downwardly extending roller support 195 having a substantially horizontal portion 196 carrying a pair of spaced apart freely rotatable rollers 197 and 198 which engage the adjacent side face of the track 13. The roller 187 carried by roller support 186 engages the opposite side face of the track at a point intermediate the rollers 197 and 198. The rollers 197 and 198 carried by slide plate 193 are urged into engagement with the side face of the template track by springs 199 and 200, said springs being fastened respectively at one end to the roller spindles 190 and 191 and at their opposite ends to vertical posts 201 and 202 mounted upon the roller support 195.

Carried by the roller support 185 is a cutter holder support 203 secured thereto by a bolt or the like 204, said cutter holder support comprising a metallic block having a substantially rectangular socket formed therein and within which the cutter holder 205 is mounted for vertical sliding movement, said cutter holder carrying at its lower end the freely rotatable steel cutting wheel 15. The opposed side walls of the socket formed in the cutter holder support 203 are provided with vertical slots 206 and carried by the cutter holder and operable within these slots are horizontal pins 207, the downward movement of the cutter holder being limited by engagement of the pins 207 with the lower ends of said slots.

Pivotally mounted upon the cutter holder support 203 as at 208 is a lever 209, said lever straddling the cutter holder support and the inner ends thereof engaging pins 207 to normally urge the cutter holder 205 and cutting wheel 15 downwardly. Fastened to the opposite end of the lever 209 is a tension spring 210 attached at its upper end to a bolt 211 passing loosely through an ear 212 formed on the roller support 185 and having a nut 213 threaded upon its upper end. The spring 210 acts to yieldably urge the cutting wheel toward and maintain it in engagement with the sheet.

Operation

Figure 5:
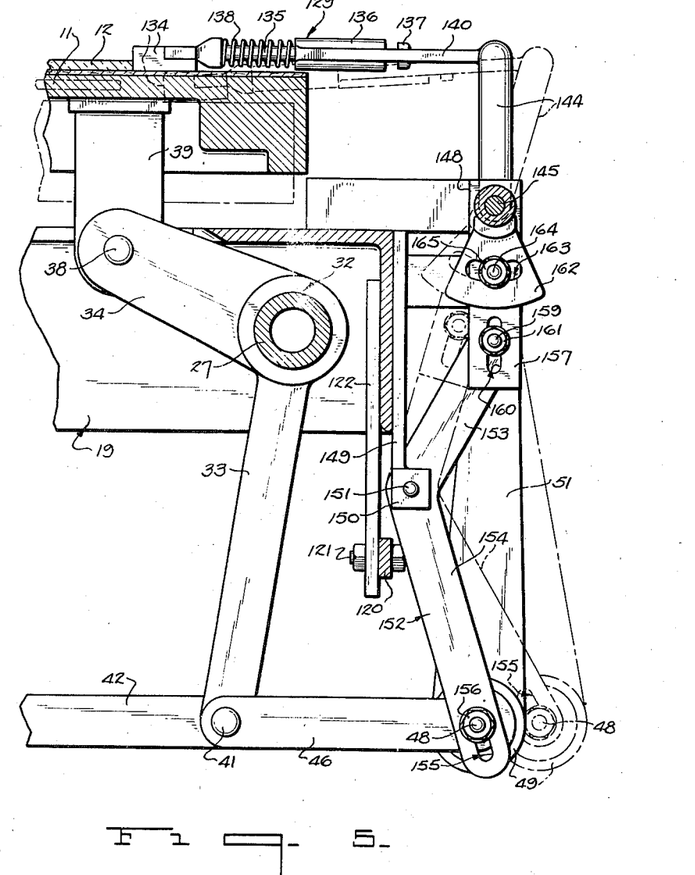
Fig. 5 is a transverse section taken substantially on line 5—5 of Fig. 1.

In the operation of the cutting machine above described and during the feeding of the glass sheets to be cut thereto, the table top 11 is in its lowered position at which time the conveyor rolls 80 to 83 project upwardly a slight distance above the upper surface of said table top. The glass sheet to be cut is laid upon the conveyor rolls 80 and 81 of the receiving section a of the cutting table and positioned with the rear edge thereof in contact with guide rollers 89. As the conveyor rolls 80 to 83 are continuously operating, the sheet, as soon as released by the operator, will be carried forwardly onto the cutting section b of the table and beneath the cutting mechanism. At this time, the stop plate 105 is in its lowered full line position (Fig. 2) and as the front edge of the sheet engages said stop plate the said sheet will be automatically brought to a stop beneath the cutting mechanism. Also at this time the tubular member 49 is in its forward broken line position as shown in Fig. 4, with the lug 64 disposed in front of the latch plate 60 carried by locking bar 57 and likewise the movable clamping members 128 and 129 and associated operating parts will be in the broken line position, as shown in Fig. 5.

As soon as the glass sheet has been brought to a stop upon the cutting table, the operator forces the tubular member 49 inwardly thereby causing the bell-crank levers 28, 29 and 32 to be rocked in a clockwise direction to effect the raising of the table top which will lift the glass sheet from the conveyor rolls and move it upwardly into cutting position. As the tubular member 49 is moved inwardly, the lug 64 will pass beneath latch plate 60, and when the latch plate drops in front of said lug the table will be locked in its raised position. Upon inward movement of the tubular member 49 to raise the table, the rocker lever 152 will be simultaneously rocked upon its pivot 151 to move the clamping members 128 and 129 inwardly into engagement with the front edge of the sheet, thereby clamping the said sheet between these members and the fixed clamping members 126 and 127. In this manner, the sheet will be firmly held in proper position during cutting and in order to effect the cutting thereof, it is simply necessary for the operator to grasp the hand grip 184 of the cutting unit 14 and move the said unit around the template 13, during which movement the cutting wheel 15 will be yieldably held in engagement with the glass sheet to score the same along the line 16.

After the cut has been completed, the operator presses downwardly upon the foot pedal 66 which will elevate the forward end of locking bar 57 to release the lug 64 from in back of latch plate 60 thereby permitting outward movement of the tubular member 49 and the lowering of the table by its own weight. This outward movement of tubular member 49 will also effect the clamping members 128 and 129 to be moved outwardly away from the glass sheet. Upon raising of the locking bar 57, the lever arm 120 will be rocked thereby about its pivot to elevate the stop plate 105 so that just as soon as the table is lowered, the sheet will be immediately discharged therefrom by the conveyor rolls 82 and 83 onto the take-off conveyor 18. The stop plate 105 will of course be raised only momentarily and then lowered, at which time the rollers 125 thereof will engage and ride over the glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine for cutting sheets or plates of glass or the like, means for supporting the sheet to be cut, fixed clamping means engaging one edge of the sheet, substantially horizontal clamping members freely supported at their inner ends upon said sheet supporting means and engaging the opposite edge of the sheet for holding the said sheet against the fixed clamping means, rockably mounted means to which the movable clamping members are pivotally connected at their outer ends for vertical and horizontal movement, and means under the control of an operator for rocking said supporting means to move the movable clamping members inwardly to engage the sheet.

2. In a machine for cutting sheets or plates of glass or the like, means for supporting the sheet to be cut, fixed clamping means engaging one edge of the sheet, substantially horizontal clamping members freely supported at their inner ends upon said sheet supporting means and engaging the opposite edge of the sheet for holding the said sheet against the fixed clamping means, rockably mounted means to which the movable clamping members are pivotally connected at their outer ends for vertical and horizontal movement, and means under the control of an operator for rocking said supporting means to move the movable clamping members inwardly to engage the sheet, said last mentioned means having relatively adjustable parts to vary the inward movement of the movable clamping members upon said sheet supporting means.

3. In a machine for cutting sheets or plates of glass or the like, a vertically movable table for supporting the sheet to be cut, fixed clamping means carried by said table and engaging one edge of the sheet, movable clamping means engaging the opposite edge of the sheet for holding the said sheet against the fixed clamping means, means for raising said table, and means for substantially simultaneously actuating said movable clamping means to clamp the sheet between said fixed and movable clamping means.

4. In a machine for cutting sheets or plates of glass or the like, a vertically movable table for supporting the sheet to be cut, fixed clamping means carried by said table and engaging one edge of the sheet, horizontally movable clamping means engaging the opposite edge of the sheet for holding the said sheet against the fixed clamping means, means for raising said table, and means for substantially simultaneously moving said movable clamping means inwardly to clamp the sheet between said fixed and movable clamping means.

5. In a machine for cutting sheets or plates of glass or the like, a vertically movable table for supporting the sheet to be cut, fixed clamping means carried by said table and engaging on edge of the sheet, substantially horizontal clamping means freely supported at their inner ends upon said table and engaging the opposite edge of the sheet for holding the said sheet against the fixed clamping means, means for pivotally supporting said movable clamping means at their outer ends for horizontal movement toward and away from the sheet, means for raising said table, and means for substantially simultaneously actuating said last-named supporting means to move the movable clamping means inwardly to clamp the sheet between said fixed and movable clamping means.

6. In a machine for cutting sheets or plates of glass or the like, a vertically movable table for supporting the sheet to be cut, fixed clamping means carried by said table and engaging one edge of the sheet, substantially horizontal clamping members freely supported at their inner ends upon said table and engaging the opposite edge of the sheet for holding the said sheet against the fixed clamping means, rockably mounted means to which the movable clamping members are pivotally connected at their outer ends for vertical and horizontal movement, means for raising said table, and means for substantially simultaneously rocking said supporting means to move the movable clamping members inwardly to clamp the sheet between said fixed clamping means and movable clamping members.

7. In a machine for cutting sheets or plates of glass or the like, a vertically movable table for supporting the sheet to be cut, fixed clamping means carried by said table and engaging one edge of the sheet, substantially horizontal clamping members freely supported at their inner ends upon said table and engaging the opposite edge of the sheet for holding the said sheet against the fixed clamping means, rockably mounted means to which the movable clamping members are pivotally connected at their outer ends for vertical and horizontal movement, means for raising said table, and means for substantially simultaneously rocking said supporting means to move the movable clamping members inwardly to clamp the sheet between said fixed clamping means and movable clamping members, said last-mentioned means having relatively adjustable parts to vary the inward movement of the movable clamping members upon the said table.

8. In a machine for cutting sheets or plates of glass or the like, a vertically movable table for supporting the sheet to be cut, means for feeding the sheet forwardly upon said table, means engageable by the front edge of the sheet for stopping the forward movement thereof when it reaches a predetermined position on the said table to bring the sheet into position for cutting and subsequently lowering said table after cutting, and means operable upon lowering of said table for rendering said stop means ineffective to permit the removal of the sheet from the said table.

9. In a machine for cutting sheets or plates of glass or the like, a vertically movable table for supporting the sheet to be cut, means for feeding the sheet forwardly upon said table, pivotally mounted means engageable by the front edge of the sheet for stopping the forward movement thereof when it reaches a predetermined position on the said table, means for raising the table to bring the sheet into position for cutting and subsequently lowering said table after cutting, and means automatically actuated by lowering of said table for rendering said stop means ineffective to permit the removal of the sheet from the said table.

10. In a machine for cutting sheets or plates of glass or the like, a vertically movable table for supporting the sheet to be cut, means for feeding the sheet forwardly upon said table, means engageable by the front edge of the sheet for stopping the forward movement thereof when it reaches a predetermined position on the said table, means for raising the table to bring the sheet into cutting position, means for locking said table in raised position, means for releasing the table locking means to effect lowering of said table after the sheet has been cut, and means actuated by said locking means upon the release thereof for rendering said stop means ineffective to permit the removal of the sheet from the said table.

11. In a machine for cutting sheets or plates of glass or the like, a table for supporting the sheet to be cut, means for feeding the sheet forwardly upon said table, means engageable by the front edge of the sheet for stopping the forward movement thereof when it reaches a predetermined position on the said table, fixed clamping means carried by the table and engaging one edge of the sheet, movable clamping means engaging the opposite edge of the sheet for holding the said sheet against the fixed clamping means during cutting of said sheet, means under the control of an operator for actuating said movable clamping means, and means for rendering said stop means ineffective after the cutting of the sheet has been completed to permit the removal of the cut sheet from the table.

12. In a machine for cutting sheets or plates of glass or the like, a table for supporting the sheet to be cut, means for feeding the sheet forwardly upon said table, pivotally mounted means engageable by the front edge of the sheet for stopping the forward movement thereof when it reaches a predetermined position on the said table, fixed clamping means carried by the table and engaging one edge of the sheet, horizontally movable clamping means engaging the opposite edge of the sheet for holding the said sheet against the fixed clamping means during cutting of said sheet, means under the control of an operator for moving said movable clamping means inwardly to engage the sheet, and means for rendering said stop means ineffective after the cutting of the sheet has been completed to permit the removal of the cut sheet from the table.

13. In a machine for cutting sheets or plates of glass or the like, a vertically movable table for supporting the sheet to be cut, means for feeding the sheet forwardly upon said table, means engageable by the front edge of the sheet for stopping the forward movement thereof when it reaches a predetermined position on the said table, fixed clamping means carried by the table and engaging one edge of the sheet, movable clamping means engaging the opposite edge of the sheet for holding the said sheet against the fixed clamping means, means for raising the table to bring the sheet into cutting position, means for substantially simultaneously actuating said movable clamping means to clamp the sheet between said fixed and movable clamping means, said table being lowered subsequent to the cutting of said sheet, and means operable upon lowering of said table for rendering said stop means ineffective to permit the removal of the sheet from the table.

14. In a machine for cutting sheets or plates of glass or the like, a vertically movable table for supporting the sheet to be cut, means for feeding the sheet forwardly upon said table, pivotally mounted means engageable by the front edge of the sheet for stopping the forward movement thereof when it reaches a predetermined position on the said table, fixed clamping means carried by the table and engaging one edge of the sheet, horizontally movable clamping means engaging the opposite edge of the sheet for holding the said sheet against the fixed clamping means, means for raising the table to bring the sheet into cutting position, means for substantially simultaneously moving said movable clamping means inwardly to clamp the sheet between said fixed and movable clamping means, said table being lowered subsequent to the cutting of said sheet, and means automatically actuated by lowering of said table for rendering said stop means ineffective to permit the removal of the sheet from the said table.

15. In a machine for cutting sheets or plates of glass or the like, a vertically movable table for supporting the sheet to be cut, means for feeding the sheet forwardly upon said table, means engageable by the front edge of the sheet for stopping the forward movement thereof when it reaches a predetermined position on the said table, fixed clamping means carried by the table and engaging one edge of the sheet, movable clamping means engaging the opposite edge of the sheet for holding the said sheet against the fixed clamping means, means for raising the table to bring the sheet into cutting position, means for locking said table in raised position, means operable substantially simultaneously with the raising of the table for moving said movable clamping means into engagement with the sheet to clamp the said sheet between said fixed and movable clamping means, means for releasing the table locking means after the sheet has been cut to effect the lowering of the table, and means actuated by said table locking means upon the release thereof for rendering said stop means ineffective to permit the removal of the sheet from the said table.

16. In a machine for cutting sheets or plates of glass or the like, a vertically movable table for supporting the sheet to be cut, means for feeding the sheet forwardly upon said table, pivotally mounted means engageable by the front edge of the sheet for stopping the forward movement thereof when it reaches a predetermined position on the said table, fixed clamping means carried by the table and engaging one edge of the sheet, horizontally movable clamping means engaging the opposite edge of the sheet for holding the said sheet against the fixed clamping means, means for raising the table to bring the sheet into cutting position, means for locking said table in raised position, means operable substantially simultaneously with the raising of the table for moving said movable clamping means inwardly into engagement with the sheet to clamp the said sheet between said fixed and movable clamping means, means for releasing the table locking means after the sheet has been cut to effect the lowering of the table, and means actuated by said table locking means upon the release thereof for rendering said stop means ineffective to permit the removal of the sheet from said table.

17. In a machine for cutting sheets or plates of glass or the like, a vertically movable table for supporting the sheet to be cut, means for feeding the sheet forwardly upon said table, means engageable by the front edge of the sheet for stopping the forward movement thereof when it reaches a predetermined position on the said table, fixed clamping means carried by the table and engaging the rear edge of the sheet, substantially horizontal clamping means freely supported at their inner ends upon said table and engaging the front edge of the sheet for holding the said sheet against the fixed clamping means, means for pivotally supporting said movable clamping means at their outer ends for horizontal movement toward and away from the sheet, means under the control of an operator for raising the table to bring the sheet into cutting position, means for locking said table in raised position, means operable by said table raising means for moving said movable clamping means inwardly into engagement with the sheet to clamp the said sheet between said fixed and movable clamping means, means after the sheet has been cut under the control of an operator for releasing the table locking means to effect the lowering of said table, and means actuated by said table locking means upon the release thereof for rendering said stop means ineffective to permit the removal of the sheet from the said table.

18. In a machine for cutting sheets or plates of glass or the like, a vertically movable table for supporting the sheet to be cut, means for supporting said table, fixed clamping means engaging one edge of the sheet, movable clamping means engaging the opposite edge of the sheet for holding the said sheet against the fixed clamping means, means for supporting said movable clamping means, and a common operating means operatively connected with said table supporting means and also with the supporting means for said movable clamping means for raising said table and for substantially simultaneously actuating said movable clamping means to move the said movable clamping means into engagement with the sheet.

19. In a machine for cutting sheets or plates of glass or the like, a vertically movable table for supporting the sheet to be cut, means for supporting said table, fixed clamping means engaging one edge of the sheet, horizontally movable clamping means engaging the opposite edge of the sheet for holding the said sheet against the fixed clamping means, means for supporting said movable clamping means, and means operatively connected with the table supporting means and also with supporting means for said movable clamping means and under the control of an operator for raising said table and for substantially simultaneously moving said movable clamping means inwardly to engage the sheet.

20. In a machine for cutting sheets or plates of glass or the like, a vertically movable table for supporting the sheet to be cut, fixed clamping means engaging one edge of the sheet, substantially horizontal clamping means freely supported at their inner ends upon said sheet supporting means and engaging the opposite edge of the sheet for holding the said sheet against the fixed clamping means, means for pivotally supporting said movable clamping means at their outer ends for horizontal movement toward and away from the sheet, and a common operating means under the control of an operator for raising said table and for substantially simultaneously actuating said last-named supporting means to move the movable clamping means inwardly to engage the sheet.

JOSEPH R. MORRIS.